Patented June 29, 1954

2,682,519

UNITED STATES PATENT OFFICE 2,682,519

MIXTURES COMPRISING ACRYLONITRILE POLYMERS WITH HYDROLYZED INTERPOLYMERS OF VINYL ACETATE

John R. Caldwell, Kingsport, Tenn., assignor to Eastman Kodak Company, Rochester, N. Y., a corporation of New Jersey No Drawing. Application August 1, 1951,
Serial No. 239,836

20 Claims. (Cl. 260—30.4)

This invention relates to resinous compositions comprising mixtures of acrylonitrile polymers and certain hydrolyzed interpolymers of vinyl acetate, and to articles produced therefrom.

It is well known that fibers derived from polymers containing about 80% or more by weight or acrylonitrile are very difficult to dye. In fact, the common types of dyes such as acid wool, direct cotton, insoluble vat, and cellulose acetate dyes do not color the fiber at all. It is apparent that the utility of acrylonitrile polymer fibers is severely limited by this lack of dyeability.

Numerous attempts have been made to improve the properties of polyacrylonitrile and fibers produced therefrom. For example, acrylonitrile has been copolymerized with substantial amounts of certain other unsaturated monomers whose polymers are known to have good affinity for certain types of commercial dyes. While this procedure does give polymeric products having variably improved dyeabilities, a serious drawback arises in that fibers produced from such interpolymers show a materially lower softening point and thereby limits their uses. For example, while an interpolymer of acrylonitrile and vinyl acetate, containing about 80% by weight of acrylonitrile and 20% by weight of vinyl acetate in the polymer molecule, can be drawn into fibers readily susceptible to some dyes, the softening point of such fibers is too low for practical purposes, softening of the fibers being observed at about 150° to 170° C.

Another procedure for improving the properties of polyacrylonitrile has been to mix the polyacrylonitrile, before spinning, with other non-polymerizable, film-forming materials which are known to be readily dyed by common types of dyes. However, it has been well established that polyacrylonitrile and acrylonitrile polymers containing high percentages of acrylonitrile are incompatible or tend to be incompatible with most other high molecular weight materials, particularly in the percentage ranges required of the other added materials to produce compositions having good affinities for dyes. For example, it can be demonstrated that mixtures of polyacrylonitrile with polyvinyl acetate, when dissolved in either N,N-dimethyl formamide or in N,N-dimethylacetamide in proportions varying from 15% to 50% by weight of polyvinyl acetate to from 85% to 50% by weight of polyacrylonitrile, form grainy dopes which separate on standing into two liquid layers, and that fibers formed from such mixtures show segmentation into their individual components along their horizontal axes. This is also true of many other polymeric compounds, natural or synthetic, which are soluble in the above solvents.

In copending application Serial No. 154,877, filed April 8, 1950, in the names of T. E. Stanin and J. B. Dickey (now U. S. Patent No. 2,571,777, dated October 16, 1951), there are described and claimed certain mixtures of polyacrylonitrile with certain interpolymers of vinyl acetate and isopropenyl acetate which form stable solutions that do not separate into layers on standing, and from which fibers of homogeneous distribution can be spun. These fibers are characterized by having softening points higher than the interpolymers of acrylonitrile mentioned above, and do not exhibit the segmentation defect shown by many of the fibers prepared from certain prior art mixtures comprising polyacrylonitrile. While these fibers can be readily dyed with cellulose acetate, basic and acid-wool dyes, they show lesser affinity for vat dyes and relatively poor affinity for direct cotton dyes.

I have now found by introducing free hydroxyl groups into interpolymers of vinyl acetate with certain other unsaturated esters, and mixing such hydroxyl group containing interpolymers with acrylonitrile polymers containing from 75 to 100% by weight of acrylonitrile, that fibers prepared from such mixtures show not only high softening points, non-segmentation and other good physical properties, but can be deeply dyed by insoluble vat and direct cotton dyes, as well as with cellulose acetate, basic and acid-wool dyes.

It is, accordingly, an object of the invention to provide resinous compositions comprising mixtures of acrylonitrile polymers containing at least 75% by weight of acrylonitrile and hydroxyl group containing interpolymers of vinyl acetate with certain other unsaturated esters. Another object is to provide methods for preparing these mixtures. A further object is to provide homogeneous solutions of these mixtures. Another object is to provide fibers from these mixtures of good dyeability. Other objects will become apparent hereinafter.

In accordance with the invention, I prepare polymer mixtures comprising from 60 to 90 parts by weight of polyacrylonitrile or of an acrylonitrile polymer containing at least 75% by weight of acrylonitrile, and from 40 to 10 parts by weight of a hydrolyzed interpolymer of vinyl acetate and another unsaturated ester, but the preferred products are mixtures comprising from 70 to 80 parts of the polymeric acrylonitrile compound and from 30 to 20 parts of the interpolymer. The above mixtures can be prepared by any of several methods. The two polymeric components can be mixed together in a suitable mixer such as a ball mill or Banbury mixer or they can be dissolved in one or more mutual solvents such as N,N-dimethylformamide, N,N-dimethylacetamide, ethylene carbonate, N-methyl-2-pyrrolidone, γ-butyrolactone, mixtures of acetonitrile and N,N-dimethylformamide, etc. The components can be mixed together before addition to the solvent or they can be added separately to the solvent. They can also be added to the solvent to produce a slurry or dispersion, which is then agitated and heated to effect solution. The solubility of the resins can be improved by incorporating a small amount of acids such as sulfuric, phosphoric, oxalic acids, and the like. Fillers, lubricants, etc. can also be added as desired. The concentration of solids in the solvents can be varied, depending on the use for which the composition is intended. However, for most purposes it has been found that from about 10 to 40% by weights of solids gives the best results. Other solvents less preferred but which can also be used in the preparation of solutions with the new resinous compositions include ethylene carbamate, N,N-dimethylmethoxy acetamide, N,N-dimethyl cyanoacetamide, dimethyl cyanamide, N,N-dimethyl-β-cyanopropionamide, glycolnitrile (formaldehyde cyanohydrin), malonitrile, dimethylsulfoxide, dimethyl sulfone, tetramethylene sulfone, tetramethylene sulfoxide, N-formyl pyrrolidine, N-formyl morpholine, N,N-tetramethyl methanephosphonamide, etc.

The solutions prepared as above described, especially when dispersed in N, N-dimethylformamide, N, N-dimethyl acetamide, gamma-butyrolactone, ethylene carbonate or in mixtures of acetonitrile and dimethylformamide, are stable homogeneous mixtures which show no tendency to separate into the components. The absence of graininess in these solutions permits smooth, trouble-free extrusion through jets in wet spinning methods employing aqueous spinning baths or organic liquids such as the lower alcohols (methanol, ethanol, etc.) and dry spinning or evaporating methods wherein the solution or dope is extruded into a heated atmosphere of air, steam or other gas. Processes for both wet and dry spinning the resinous compositions of the invention can be carried out as described in my copending application Serial No. 16,624, filed March 23, 1948. The solutions can be stored for any length of time prior to spinning without any physical change in the solutions. Fibers prepared from the solutions by either wet or dry spinning methods can be readily dyed to even, dark shades with the common types of vat, direct cotton and cellulose acetate dyes. The dyed fibers show excellent fastness to light and laundering.

The interpolymers of vinyl acetate useful in practicing the invention contain prior to hydrolysis from 40 to 65% by weight of vinyl acetate and from 60 to 35% by weight of methyl acrylate or dimethyl maleate, or interpolymers containing prior to hydrolysis from 50 to 65% by weight of vinyl acetate and from 50 to 35% by weight of isopropenyl acetate. These interpolymers can be made by the usual bead, emulsion or mass polymerization methods with peroxide type polymerization catalysts. The hydrolysis of the above described interpolymers is carried out under conditions that remove the acetyl groups from the vinyl acetate residues, but leave the other ester groups substantially unchanged. The hydrolyzed products contain approximately from 25 to 49% by weight of vinyl alcohol units, and in the case where isopropenyl acetate is the unchanged ester in the interpolymer, the vinyl alcohol content of the hydrolyzed interpolymer is by weight approximately from 33 to 49%. The amount of residual vinyl acetate groups remaining after hydrolysis is negligible. The hydrolysis can be carried out using a catalytic amount of an alkali metal in a lower alcohol, for example, sodium in methanol to give a sodium methoxide solution. Alternatively, acid catalysts such as sulfuric acid can be used. The hydrolyzed products are highly swollen by water, but insoluble therein. However, they are all soluble in lower alcohols and in solvents that dissolve acrylonitrile polymers containing a high percentage of acrylonitrile such as dimethyl formamide, dimethyl acetamide, gamma-butyrolactone, ethylene carbonate, and the other mentioned solvents for acrylonitrile polymers.

The acrylonitrile polymers which are used in practicing the invention can be 100% polyacrylonitrile or they can be copolymers containing at least 75% by weight of acrylonitrile, but preferably from 80 to 95% by weight acrylonitrile and from 20 to 5% by weight of the other unsaturate making up the copolymer. Suitable copolymers include any of the vinyl or other unsaturated monomers containing a single ethylenic unsaturation which are known to be copolymerizable with acrylonitrile, but preferably copolymers such as acrylonitrile-vinyl acetate, acrylonitrile-vinyl chloride, acrylonitrile-methylallyl alcohol, acrylonitrile-isopropenyl acetate, etc. The acrylonitrile polymers can be prepared according to the process described in U. S. patent 2,434,054, dated January 6, 1948.

The following examples will serve to illustrate more fully the manner whereby I practice my invention.

*Example 1*

A resin having the composition 60% by weight of vinyl acetate and 40% by weight of methyl acrylate was prepared by emulsion polymerization in the presence of a peroxide type polymerization catalyst. The dried resin was hydrolyzed in methyl alcohol solution containing not more than 1% of sulfuric acid by heating the solution at 60° to 65° C. for a period of 20 hours. The resin was isolated by precipitating in water and drying in vacuum. The hydrolyzed resin contained in each molecule approximately 40% by weight of vinyl alcohol and approximately 60% by weight of methyl acrylate.

100 parts by weight of polyacrylonitrile, 30 parts by weight of the above hydrolyzed vinyl acetate-methyl acrylate interpolymer and 80 parts by weight of dimethyl acetamide were mixed together. There was obtained a clear, smooth dope which showed no tendency to separate into the respective resin components after a week of storage. The dope was extruded through a multihole spinnerette into a precipitating bath consisting of 60 parts water and 40 parts of dimethyl acetamide. The filaments obtained were then washed with water and dried at 110° C. The yarn was drafted 600–700% in a steam chamber at 170°–180° C. The fibers had a tensile strength of 4.2 g. per denier and an elongation of 21%. The yarn dyed well with vat dyes, direct cotton dyes and celllulose acetate dyes.

Example 2

A resin having the composition 60% by weight of vinyl acetate and 40% by weight of isopropenyl acetate was prepared by emulsion polymerization in the presence of a peroxide type polymerization catalyst. The dried resin was dissolved in methyl alcohol containing 1% sodium methoxide and heated at 50° C. for 5 hours to hydrolyze the acetyl groups from the vinyl acetate residues. The acetyl groups on the isopropenyl acetate residues remained unchanged. The hydrolyzed product was isolated by precipitating in isopropyl ether. It consisted of about 40% by weight of vinyl alcohol and about 60% by weight of isopropenyl acetate.

100 parts by weight of a copolymeric resin having the composition 85% by weight acrylonitrile—15% by weight methallyl alcohol and 28 parts by weight of the above hydrolyzed vinyl acetate—isopropenyl acetate interpolymer were dissolved in a mixture of 400 parts of acetonitrile and 200 parts of dimethyl formamide. The clear, smooth dope obtained was extruded through a multihole spinnerette into a heated chamber maintained at 120°–130° C. The acetonitrile was flashed off and the residual dimethyl formamide was washed from the fiber. The fiber was dried and drafted 800% in a heated chamber at 150°–160° C. Fibers having a tensile strength of 3.6 g. per denier and 25% elongation were obtained. The fibers showed good dyeing with direct cotton dyes, vat dyes and cellulose acetate dyes.

Example 3

A resin having the composition 50% by weight of vinyl acetate and 50% by weight of dimethyl maleate was prepared as bead polymer using benzoyl peroxide as the polymerization catalyst. The resin was hydrolyzed in methyl alcohol solution containing about 1% by weight of sulfuric acid. The hydrolyzed product consisted of about 33% by weight of vinyl alcohol and about 67% by weight of dimethyl maleate. Less than 1% of vinyl acetate groups remained in the hydrolyzed product.

100 parts by weight of a resin having the composition 85% by weight of acrylonitrile—15% by weight of isopropenyl acetate and 35 parts by weight of the above hydrolyzed vinyl acetate—dimethyl maleate interpolymer were dissolved in 700 parts by weight of gamma-butyrolactone; a clear, smooth dope being obtained. The dope was spun into a bath of 35% butyrolactone–65% water. The fibers obtained were washed, dried and drafted to give yarn testing 3.2 g. per denier and 28% elongation. The yarn dyed well with direct cotton, vat and cellulose acetate dyes.

Example 4

A resin having the composition 40% by weight of vinyl acetate and 60% by weight of dimethyl maleate was prepared as a bead polymer using acetyl peroxide as the polymerization catalyst. The resin was hydrolyzed with a methanol solution of sodium methoxide to remove acetyl groups from the vinyl acetate units. The hydrolyzed resin contained in each molecule approximately 25% by weight of vinyl alcohol and approximately 75% by weight of dimethyl maleate.

A spinning dope was prepared by dissolving by weight 90 parts of polyacrylonitrile and 10 parts of the above hydrolyzed interpolymer in 500 parts of dimethyl acetamide. Fibers spun by the dry and evaporative processes showed satisfactory tensile strength and elongation and good dyeing properties with cellulose acetate, vat and direct cotton dyes.

Example 5

A resin having the composition 65% by weight of vinyl acetate and 35% by weight of isopropenyl acetate was prepared by heating the reactants together at 60° C. for 48 hours, in the presence of 1% benzoyl peroxide. The interpolymer was hydrolyzed in a methanol solution of sodium methoxide to remove acetyl groups from the vinyl acetate units. The hydrolyzed resin contained in each molecule approximately 49% by weight of vinyl alcohol and 51% by weight of isopropenyl acetate.

A spinning dope was prepared by dissolving by weight 100 parts of polyacrylonitrile and 40 parts of the above hydrolyzed interpolymer in 600 parts of gamma-butyronitrile. Fibers spun from the solution showed good dyeing with cellulose acetate dyes, vat dyes and direct cotton dyes.

Proceeding as described in the above examples other polymer mixtures having similar dyeing affinities and similar physical properties can be prepared by admixture of any of the hydrolyzed vinyl acetate interpolymers with polyacrylonitrile or with an acrylonitrile polymer in any proportions coming within the specified range of mixtures. For example, excellent mixed compositions are also obtained with hydrolyzed interpolymers resulting from the hydrolysis of an interpolymer containing 45% by weight of vinyl acetate and 55% by weight of methyl acrylate or of dimethyl maleate, and from hydrolyzed interpolymers resulting from the hydrolysis of an interpolymer containing 60% by weight of vinyl acetate and 40% by weight of methyl acrylate or of dimethyl maleate, etc.

Although the new mixed compositions of the invention have been illustrated in the examples in their fiber-forming properties, it will be understood that the solutions or dopes mentioned can also be coated on a film-forming surface to give sheet materials, which can also have incorporated therein, if desired, fillers, dyes, plasticisers, and the like.

What I claim is:

1. A resinous composition selected from the group consisting of a mixture comprising from 60 to 90 parts by weight of polyacrylonitrile and from 40 to 10 parts by weight of a hydrolyzed interpolymer of vinyl acetate containing from 25 to 49% by weight of vinyl alcohol and from 75 to 51% by weight of a compound selected from the group consisting of methyl acrylate, dimethyl maleate and isopropenyl acetate, and a mixture comprising from 60 to 90 parts by weight of a copolymer containing from 75 to 95% by weight of acrylonitrile and from 25 to 5% by weight of a compound selected from the group consisting of isopropenyl acetate and methallyl alcohol and from 40 to 10 parts by weight of a hydrolyzed interpolymer of vinyl acetate containing from 25 to 49% by weight of vinyl alcohol and 75 to 51% by weight of a compound selected from the group consisting of methyl acrylate, dimethyl maleate and isopropenyl acetate.

2. A resinous composition comprising a mixture of from 70 to 80 parts by weight of polyacrylonitrile and from 30 to 20 parts by weight of a hydrolyzed interpolymer of vinyl acetate containing approximately from 25 to 49% by weight of vinyl alcohol and approximately from 75 to 51% by weight of methyl acrylate.

3. A resinous composition comprising a mixture of from 70 to 80 parts by weight of polyacrylonitrile and from 30 to 20 parts by weight of a hydrolyzed interpolymer of vinyl acetate containing approximately from 25 to 49% by weight of vinyl alcohol and approximately from 75 to 51% by weight of dimethyl maleate.

4. A resinous composition comprising a mixture of from 70 to 80 parts by weight of polyacrylonitrile and from 30 to 20 parts by weight of a hydrolyzed interpolymer of vinyl acetate containing approximately from 33 to 49% by weight of vinyl alcohol and approximately from 67 to 51% by weight of isopropenyl acetate.

5. A resinous composition comprising a mixture of from 70 to 80 parts by weight of a copolymeric resin containing from 80 to 95% by weight of acrylonitrile and from 20 to 5% by weight of methallyl alcohol, and from 30 to 20 parts by weight of a hydrolyzed interpolymer of vinyl acetate containing approximately from 33 to 49% by weight of vinyl alcohol and approximately from 67 to 51% by weight of isopropenyl acetate.

6. A resinous composition comprising a mixture of from 70 to 80 parts by weight of a copolymeric resin containing from 80 to 95% by weight of acrylonitrile and from 20 to 5% by weight of isopropenyl acetate, and from 30 to 20 parts by weight of a hydrolyzed interpolymer of vinyl acetate containing approximately from 25 to 49% by weight of vinyl alcohol and approximately from 75 to 51% by weight of dimethyl maleate.

7. A resinous composition comprising a mixture of 100 parts by weight of polyacrylonitrile and 30 parts by weight of a hydrolyzed interpolymer of vinyl acetate containing approximately 40% by weight of vinyl alcohol and approximately 60% by weight of methyl acrylate.

8. A resinous composition comprising a mixture of 90 parts by weight of polyacrylonitrile and 10 parts by weight of a hydrolyzed interpolymer of vinyl acetate containing approximately 25% by weight of vinyl alcohol and approximately 75% by weight of dimethyl maleate.

9. A resinous composition comprising a mixture of 100 parts by weight of polyacrylonitrile and 40 parts by weight of a hydrolyzed interpolymer of vinyl acetate containing approximately 49% by weight of vinyl alcohol and approximately 51% by weight of isopropenyl acetate.

10. A resinous composition comprising a mixture of 100 parts of a copolymeric resin containing approximately 85% by weight of acrylonitrile and approximately 15% by weight of methallyl alcohol, and 28 parts by weight of a hydrolyzed interpolymer of vinyl acetate containing approximately 40% by weight of vinyl alcohol and approximately 60% by weight of isopropenyl acetate.

11. A resinous composition comprising a mixture of 100 parts by weight of a copolymeric resin containing approximately 85% by weight of acrylonitrile and approximately 15% by weight of isoproprenyl acetate, and 35 parts by weight of a hydrolyzed interpolymer of vinyl acetate containing approximately 33% by weight of vinyl alcohol and approximately 67% by weight of dimethyl maleate.

12. A solution of a resinous composition selected from the group consisting of a mixture comprising from 60 to 90 parts by weight of polyacrylonitrile and from 40 to 10 parts by weight of a hydrolyzed interpolymer of vinyl acetate containing from 25 to 49% by weight of vinyl alcohol and from 75 to 51% by weight of a compound selected from the group consisting of methyl acrylate, dimethyl maleate and isopropenyl acetate, and a mixture comprising from 60 to 90 parts by weight of a copolymer containing from 75 to 95% by weight of acrylonitrile and from 25 to 5% by weight of a compound selected from the group consisting of isopropenyl acetate and methallyl alcohol and from 40 to 10 parts by weight of a hydrolyzed interpolymer of vinyl acetate containing from 25 to 49% by weight of vinyl alcohol and 75 to 51% by weight of a compound selected from the group consisting of methyl acrylate, dimethyl maleate and isopropenyl acetate, in a solvent selected from the group consisting of N,N-dimethyl formamide, N,N-dimethylacetamide, ethylene carbonate, N-methyl-2-pyrrolidone and gamma-butyrolactone.

13. A solution of a resinous composition comprising a mixture of from 70 to 80 parts by weight of polyacrylonitrile and from 30 to 20 parts by weight of a hydrolyzed interpolymer of vinyl acetate containing approximately from 25 to 49% by weight of vinyl alcohol and approximately from 75 to 51% by weight of methyl acrylate, in N,N-dimethyl acetamide.

14. A solution of a resinous composition comprising a mixture of from 70 to 80 parts by weight of polyacrylonitrile and from 30 to 20 parts by weight of a hydrolyzed interpolymer of vinyl acetate containing approximately from 25 to 49% by weight of vinyl alcohol and approximately from 75 to 51% by weight of dimethyl maleate, in N,N-dimethyl acetamide.

15. A solution of a resinous composition comprising a mixture of from 70 to 80 parts by weight of polyacrylonitrile and from 30 to 20 parts by weight of a hydrolyzed interpolymer of vinyl acetate containing approximately from 33 to 49% by weight of vinyl alcohol and approximately from 67 to 51% by weight of isopropenyl acetate, in gamma-butyrolactone.

16. A solution of a resinous composition comprising a mixture of from 70 to 80 parts by weight of a copolymeric resin containing from 80 to 95% by weight of acrylonitrile and from 20 to 5% by weight of methallyl alcohol, and from 30 to 20 parts by weight of a hydrolyzed interpolymer of vinyl acetate containing approximately from 33 to 49% by weight of vinyl alcohol and approximately from 67 to 51% by weight of isopropenyl acetate, in a 2:1 mixture of acetonitrile and N,N-dimethyl formamide.

17. A solution of a resinous composition comprising a mixture of from 70 to 80 parts by weight of a copolymeric resin containing from 80 to 95% by weight of acrylonitrile and from 20 to 5% by weight of dimethyl maleate, and from 30 to 20 parts by weight of a hydrolyzed interpolymer of vinyl acetate containing approximately from 25 to 49% by weight of vinyl alcohol and approximately from 75 to 51% by weight of dimethyl maleate, in gamma-butyrolactone.

18. A solution of a resinous composition comprising a mixture of 100 parts by weight of polyacrylonitrile and 30 parts by weight of a hydrolyzed interpolymer of vinyl acetate containing approximately 40% by weight of vinyl alcohol and approximately 60% by weight of methyl acrylate, in N,N-dimethyl acetamide.

19. A solution of a resinous composition comprising a mixture of 100 parts by weight of a copolymeric resin containing approximately 85% by weight of acrylonitrile and approximately 15% by weight of methallyl alcohol, and 28 parts by weight of a hydrolyzed interpolymer of vinyl acetate containing approximately 40% by weight of vinyl alcohol and approximately 60% by weight of isopropenyl acetate, in a 2:1 mixture of acetonitrile and N,N-dimethyl formamide.

20. A solution of a resinous composition comprising a mixture of 100 parts of a copolymeric resin containing approximately 85% by weight of acrylonitrile and approximately 15% by weight of isopropenyl acetate, and 35 parts of a hydrolyzed interpolymer of vinyl acetate containing approximately 33% by weight of vinyl alcohol and approximately 67% by weight of dimethyl maleate, in gamma-butyrolactone.

References Cited in the file of this patent

UNITED STATES PATENTS

| Number | Name | Date |
|---|---|---|
| 2,290,600 | Neher et al. | July 21, 1942 |
| 2,527,863 | Webb | Oct. 31, 1950 |
| 2,558,793 | Stanin et al. | July 3, 1951 |
| 2,571,683 | Coover, Jr., et al. | Oct. 16, 1951 |
| 2,571,777 | Stanin et al. | Oct. 16, 1951 |
| 2,575,006 | Coover, Jr., et al. | Nov. 13, 1951 |